(12) United States Patent
Coeck et al.

(10) Patent No.: US 12,260,420 B2
(45) Date of Patent: Mar. 25, 2025

(54) THREE DIMENSIONAL PRINTING SYSTEM WITH SPEED OPTIMIZED VECTOR PROCESSING SYSTEM

(71) Applicant: LAYERWISE NV, Leuven (BE)

(72) Inventors: Sam Coeck, Boutersem (BE); Jonas Van Vaerenbergh, Sint-Niklaas (BE); Nachiketa Ray, Leuven (BE)

(73) Assignee: LAYERWISE NV, Leuven (BE)

( * ) Notice: Subject to any disclaimer, the term of this patent is extended or adjusted under 35 U.S.C. 154(b) by 416 days.

(21) Appl. No.: 17/836,090

(22) Filed: Jun. 9, 2022

(65) Prior Publication Data

US 2022/0314553 A1  Oct. 6, 2022

Related U.S. Application Data (60) Provisional application No. 63/215,155, filed on Sep. 7, 2015.

(51) Int. Cl.
*B29C 64/393* (2017.01)
*B29C 64/245* (2017.01)
(Continued)

(52) U.S. Cl.
CPC ....... *G06Q 30/0201* (2013.01); *B29C 64/245* (2017.08); *B29C 64/268* (2017.08);
(Continued)

(58) Field of Classification Search
CPC ... B29C 64/245; B29C 64/268; B29C 64/393; B33Y 10/00; B33Y 30/00; B33Y 50/02;
(Continued)

(56) References Cited

U.S. PATENT DOCUMENTS

| | | | | |
|---|---|---|---|---|
| 6,126,884 A | * | 10/2000 | Kerekes | B33Y 10/00 425/375 |
| 6,129,884 A | * | 10/2000 | Beers | B33Y 30/00 372/12 |
| 6,132,667 A | * | 10/2000 | Beers | B33Y 10/00 425/375 |
| 6,325,961 B1 | * | 12/2001 | Beers | B29C 64/40 425/375 |

(Continued)

FOREIGN PATENT DOCUMENTS

| | | |
|---|---|---|
| DE | 102018132441 A1 | 6/2020 |
| EP | 1033229 A2 | 9/2000 |
| EP | 1705616 A1 | 9/2006 |

OTHER PUBLICATIONS

PCT International Search Report for International Search Authority for PCT/US2022/032758, mailed Sep. 23, 2022 (6 pages).

(Continued)

*Primary Examiner* — M. N. Von Buhr (57) ABSTRACT

A three-dimensional (3D) printing system includes a print engine and a controller. The print engine includes a motorized build platform, a coating apparatus, and a beam forming unit. The controller is configured to perform the following steps: (a) receiving a virtual 3D body, (b) processing the 3D body to define a plurality of N slices, the N slices individually representing intersections of the 3D body with the slice, (c) processing the N slices to represent solid portions of the 3D body with vectors, the vectors defining contours and hatching patterns, the vectors individually bounded by two endpoints, (d) for the individual slices, analyzing a scan speed error for one or more of the plurality of vectors, and (e) for the individual slices, moving some of the endpoints when the scan speed error exceeds a predetermined threshold to provide a speed corrected slice.

15 Claims, 10 Drawing Sheets

(51) Int. Cl.
*B29C 64/268* (2017.01)
*G06Q 30/0201* (2023.01)
*G06Q 30/0203* (2023.01)
*B33Y 10/00* (2015.01)
*B33Y 30/00* (2015.01)
*B33Y 50/02* (2015.01)

(52) U.S. Cl.
CPC ....... *B29C 64/393* (2017.08); *G06Q 30/0203* (2013.01); *B33Y 10/00* (2014.12); *B33Y 30/00* (2014.12); *B33Y 50/02* (2014.12)

(58) Field of Classification Search
CPC .... B22F 10/366; B22F 10/80; G05B 19/4099; G05B 19/4097; G06Q 30/0201; G06Q 30/0203
See application file for complete search history.

(56) References Cited

U.S. PATENT DOCUMENTS

| | | | | |
|---|---|---|---|---|
| 9,841,750 | B2* | 12/2017 | Willis | G05B 19/4099 |
| 10,983,505 | B2* | 4/2021 | Roychowdhury | G05B 19/4099 |
| 2006/0215246 | A1* | 9/2006 | Kerekes | G02B 26/105 |
| | | | | 359/201.1 |
| 2021/0178697 | A1 | 6/2021 | Nilakantan | |
| 2022/0161485 | A1* | 5/2022 | Hopkins | C08L 83/00 |

OTHER PUBLICATIONS

PCT Written Opinion for International Search Authority for PCT/US2022/032758, mailed Oct. 5, 2022 (8 pages).

* cited by examiner

THREE DIMENSIONAL PRINTING SYSTEM WITH SPEED OPTIMIZED VECTOR PROCESSING SYSTEM

CROSS-REFERENCE TO RELATED APPLICATIONS

This non-provisional patent application claims priority to U.S. Provisional Application Ser. No. 63/215,155, Entitled "Three Dimensional Printing System with Speed Optimized Vector Processing System" by Sam Coeck et al., filed on Jun. 25, 2021, incorporated herein by reference under the benefit of U.S.C. 119(e).

FIELD OF THE INVENTION

The present disclosure concerns an apparatus and method for a layer-by-layer fabrication of three dimensional (3D) articles by an energy beam solidification of layers of material such as polymer powders, metal powders, and photocurable resins. More particularly, the present disclosure concerns a way of correcting scan speed or execution time errors that can adversely repeatability and consistency of operation.

BACKGROUND

Three dimensional (3D) printing systems are in rapidly increasing use for purposes such as prototyping and manufacturing. Certain 3D printing systems utilize layer-by-layer processes to form 3D articles from various materials which can be metal powders, plastic powders, and photocurable resins. Each layer of material is selectively hardened with an energy beam which can be a laser beam, an electron beam, or a particle beam. The layer-by-layer processes start with a virtual 3D body such as a CAD file. The virtual 3D body is sliced with virtual horizontal slices that correspond to the layers. The virtual slices individually define contours or boundaries that are an intersection of surfaces of the 3D body with a slice. The virtual slices are converted to a vector form that can be used to control motion of the energy beam. A challenge with this conversion are scan speed and execution time errors that result from applying the vector form of the virtual slices to an energy beam system.

SUMMARY

In an aspect of the disclosure, a three-dimensional (3D) printing system is configured for fabricating or manufacturing a 3D article. The 3D printing system includes a print engine and a controller. The print engine includes a motorized build platform, a coating apparatus for forming a uniform layer of build material over the build platform, and a beam forming unit configured to scan an energy beam over the build plane that is above the build platform. The controller is configured to perform the following steps: (a) receiving a virtual 3D body, (b) processing the 3D body to define a plurality of N slices, the N slices individually representing intersections of the 3D body with the slice, (c)

processing the N slices to represent solid portions of the 3D body with vectors, the vectors defining contours and hatching patterns, the vectors individually are bounded by two endpoints, (d) for the individual slices, analyzing a scan speed error for one or more of the plurality of vectors, and (e) for the individual slices, replacing or moving some of the endpoints when the scan speed error exceeds a predetermined threshold to provide a speed corrected slice. Steps (d) and (e) eliminate or reduce scan speed errors. This maximizes overall speed of fabrication and reduces or eliminates potential overheating or overcuring that may occur with low scan speeds.

In one implementation, the controller includes at least two separate controllers including a pre-processing controller and a print engine controller which are physically separated from each other.

In another implementation, steps (c) and (d) include, for individual vectors of the plurality of vectors: computing an average scan speed for the vector, comparing the average scan speed with a default scan speed to determine the scan speed error, and if the scan speed error is larger than the predetermined threshold, then moving an endpoint of the vector to reduce or eliminate the scan speed error. The controller can define a relationship $\Delta T*V=\Delta S$, $\Delta T$ equals a temporal step size for the beam forming unit, $\Delta S$ equals a dimensional step size for the beam forming unit, and $V$=the default scan speed and can move the endpoint of the vector changes the length of the vector to more closely approximate an integer number times $\Delta S$.

In yet another implementation, the steps (d) and (e) can include, for a sequence of two or more individual vectors of the plurality of vectors: computing an average scan speed for the sequence of two or more vectors, comparing the average scan speed with a default scan speed to determine the scan speed error, and if the scan speed error is larger than the predetermined threshold, then moving one or more endpoints of the two or more vectors to reduce or eliminate the scan speed error.

In a further implementation, the controller is further configured to: operate the motorized build platform to position an upper surface of the motorized build platform or build material proximate to the build plane, operate the coating apparatus to form a new layer of the build material over the uppers surface of the motorized build platform or build material, and utilize the speed corrected slice to operate the beam forming unit to selectively solidify the new layer of build material.

DETAILED DESCRIPTION OF THE PREFERRED EMBODIMENTS

Figure 1:
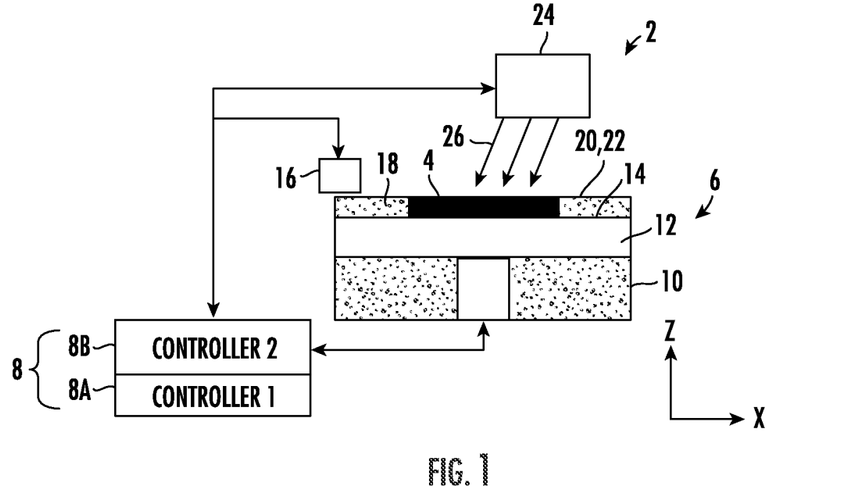
FIG. 1 is a schematic diagram of a three-dimensional (3D) printing system for forming a 3D article.

FIG. 1 is a schematic diagram of a three-dimensional (3D) printing system 2 for forming a 3D article 4. In describing 3D printing system 2, mutually orthogonal axes X, Y and Z can be used. Axes X and Y are lateral axes that are generally horizontal. Axis Z is a vertical axis that is generally aligned with a gravitational reference. By "generally" it is intended to be so by design but may vary due to manufacturing tolerances or other sources of variation.

The 3D printing system 2 includes a 3D print engine 6 coupled to a controller 8. The controller 8 can include a single computer co-located with the print engine 6 or it can include two or more computers, some of which are physically separated from or even remotely located relative to the print engine 6. In the illustrated embodiment, controller 8 includes two controllers including a first controller 8A and a second controller 8B. The first controller 8A can be physically separated or even remotely located from the print engine 6. The second controller 8B is physically connected to or more closely associated with the print engine 6.

Controller 8 includes a processor (at least one CPU) coupled to an information storage device (at least one non-transient or non-volatile device). The information storage device stores software modules that individually contain instructions. The information storage device can include one or more of non-volatile or non-transient computer memory, flash memory, and disk drives. The controller 8 is configured to operate various portions of the print engine 6 when the processor executes the instructions. In the illustrated embodiment, the first controller 8A processes a virtual 3D body and produces cross-sectional "slices" that are used by the controller 8B to control the print engine 6.

The print engine 6 includes a build container 10 containing a motorized build platform 12. Motorized build platform 12 has an upper surface 14 and a mechanism (details not shown) for precisely vertically positioning build platform 12. The mechanism can include a mechanical drive such as a rack and pinion, lead screw, or other drive system. A lead screw drive system can includes a lead screw coupled to a fixed motor. The lead screw can be received into a threaded nut that is coupled to the build platform 12. Under command of the controller 8, the motor can turn the lead screw to vertically position the build platform 12.

Print engine 6 includes a coating apparatus 16 that is configured to form a uniform layer of material 18 such as metal powder over the motorized build platform 12. When a new uniform layer of material 18 is formed, an upper surface 20 of the new uniform layer of material 18 can be referred to as partly defining a "build plane 22". A coating apparatus 16 can include a dispenser for dispensing the material 18 and a wiper blade for assuring a planar and uniform surface 20. Motion of the coating apparatus 16 during dispensing and wiping can be imparted by a motorized lead screw, a motorized belt, or other motorized movement mechanism. The dispensing apparatus can include a motorized roller or valve mechanism for metering controlled or sufficient amounts of the material 18 to assure uniformity of the new layer material 18.

Print engine 6 includes a beam forming unit 24 for forming and scanning one or more energy beams 26 over the build plane 22. Lateral scan limits of the beam forming unit 24 can define a lateral extent of the beam forming unit 24. In an illustrative embodiment, the beam forming unit includes a laser beam generator and two scanning mirrors including an X-mirror and a Y-mirror which provide motion of the laser beam across the build plane along the X and Y axes respectively.

The controller 8 is configured to operate portions of the print engine 6 to manufacture or fabricate the 3D article 4. The controller is configured to: (a) receive a data file defining 3D article 4, (b) process the data file to prepare it for operating print engine 6, (c), operate the motorized build platform to position an upper surface 14 or 20 proximate to build plane 22, (c) operate coating apparatus to apply a new layer of build material 18 to the upper surface 14 or 20, (d) operate the beam forming unit 24 to selectively harden the new layer of build material, and repeat (c)-(d) to complete manufacture or fabrication of article 4.

Figure 2:
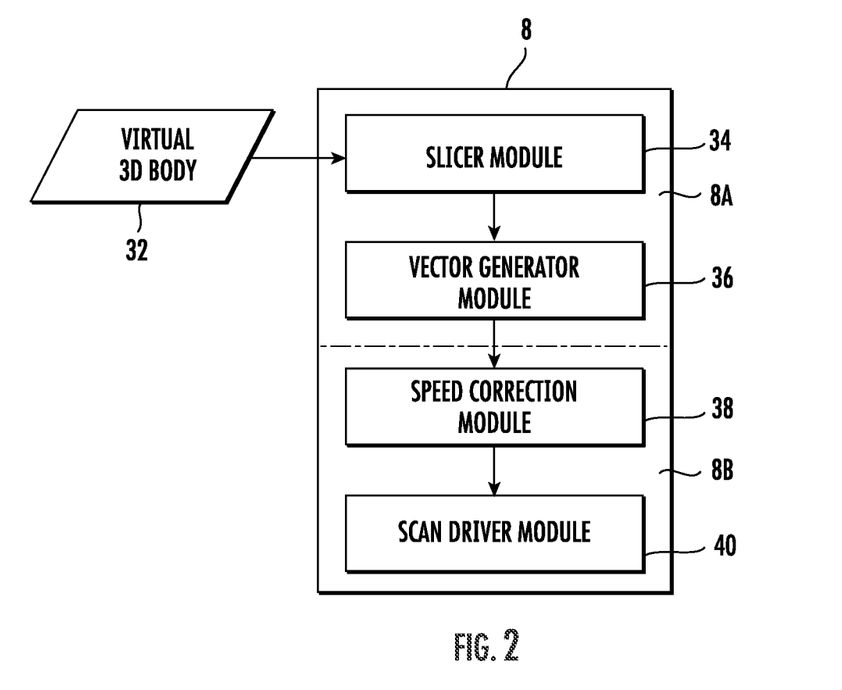
FIG. 2 is a schematic diagram of an embodiment of a controller containing various software modules.

FIG. 2 is a schematic diagram of the controller 8. More particularly, FIG. 2 is intended to illustrate software modules including software instructions that are stored and executed by one or more processors of the controller 8 to perform the operations of the software modules. In the illustrated embodiment, controller 8 includes a pre-processing controller 8A and a print engine controller 8B. The pre-processing controller 8A can be physically separated or even remotely located relative to the print engine 6. The print engine controller 8B can be partly or entirely co-located with or within print engine 6. In another embodiment, controller 8 can be one physically integrated unit. Other embodiments with other physical divisions between the software modules are possible.

Controller 8 receives a virtual 3D body 32 such as a CAD file that defines the 3D article 4 to be manufactured. A slicer module 34 receives and virtually and horizontally slices the 3D virtual body 32. This results in a file that defines virtual cross-sectional slices of the 3D virtual body 32. The virtual cross-sectional slices individually define one or more two dimensional boundaries and solid cross-sections of the 3D virtual body 32. For an individual slice, a two dimensional boundary defines an intersection between the horizontal slice and the solid body 32. The virtual cross-sectional slice also includes a representation of a solid cross-section portion of the slice.

The slices are sent to a vector generator module 36 (sometimes referred to as a hatcher module) that defines a series of linear scans that correspond to a solid portion of the slice. These scans are represented as linear vectors with endpoints defining a start and end of each vector. The result is a plurality of vector slices that individually have a plurality of vectors corresponding to energy beam 26 scans over the build plane 22.

The plurality of vector slices are sent to a speed correction module 38. Speed correction module 38 computes scan speed errors for individual vectors or groups of vectors. The speed correction module 38 corrects speed and/or temporal errors by moving or replacing endpoints of the vectors when one or more speed and/or temporal errors exceed a predetermined threshold. In the illustrated embodiment the speed correction module 38 is incorporated into the print engine controller 8B. Alternatively it can be incorporated as part of the pre-processing module 8A.

The result is a plurality of corrected vector slices having corrected vectors which are sent to a scan driver module 40. The scan driver module 40 uses the corrected vector slices to operate the beam forming unit 24. An individual slice is used to selectively harden one new layer of deposited material 18. In the foregoing, a "slice" can be interpreted as data representing horizontal slice of the virtual 3D body 32 at any stage after one or more of the software modules 34-40.

Figure 3A:
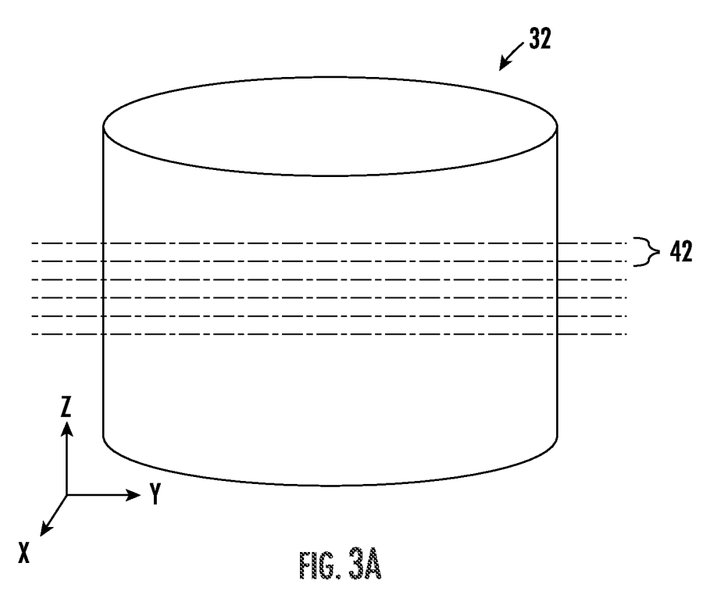
FIG. 3A is a schematic diagram of a virtual 3D body having a shape of a right oval cylinder.

FIG. 3A is an illustration of a very simple 3D virtual body 32 that is a right oval cylinder axially aligned with the vertical axis Z. The operation of the slicer module 34 is to define a vertical arrangement of horizontal virtual cross-sectional slices 42.

Figure 3B:
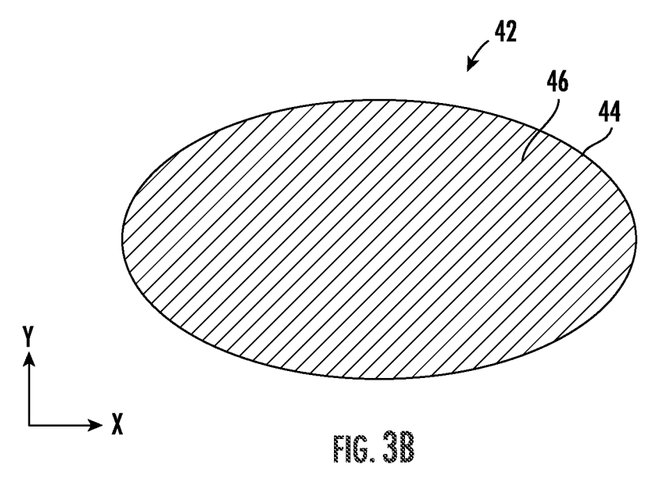
FIG. 3B is a schematic diagram of a virtual cross-sectional slice defined by a slicer module acting on the virtual 3D body of FIG. 3A.

FIG. 3B is a schematic diagram of a virtual cross-sectional slice 42 defined by the slicer module 34. The virtual cross-sectional slice 42 includes data defining an outer boundary 44 and a solidified area 46 within the outer boundary 44.

Figure 3C:
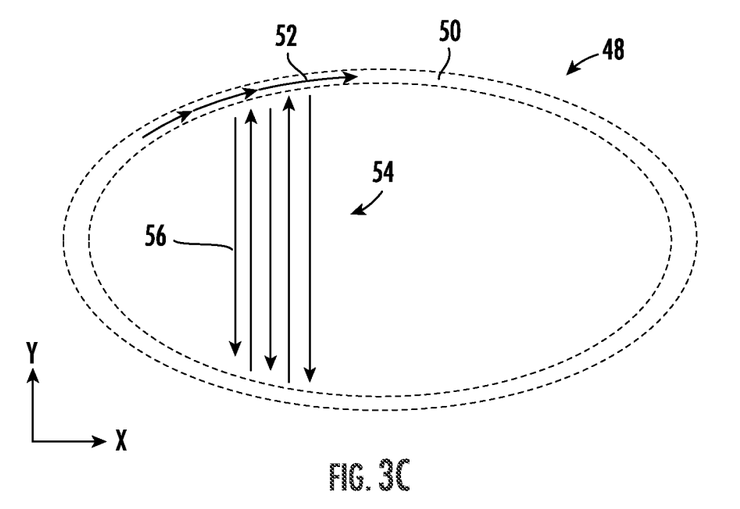
FIG. 3C is a schematic diagram of a vector slice defined by a vector generator module acting on the single virtual cross-sectional slice of FIG. 3B.

FIG. 3C is a schematic diagram of a vector slice 48 defined by the vector generator module 36 acting upon the virtual cross-sectional slice 42 of FIG. 3B. The outer boundary 44 is now replaced by a contour 50 which includes a sequence of vectors 52 (only some shown) which are placed head-to-tail to define the contour 50. In some embodiments, a contour 50 can include two or more sequences of vectors 52 passing around the contour 50 two or more times to widen the contour 50. The vectors 52 of the contour 50 "trace around" the contour 50 to form the contour 50. The contour 50 surrounds the solidified area 46 and define the outer boundary 44.

The solidified area 46 is replaced with an area hatch pattern 54 of vectors 56 (only some shown). Adjacent vectors 56 can have opposing directions over the hatch pattern 54. In some embodiments, additional vectors may attach heads and tails of adjacent vectors 56 so that a laser stays on during the hatching process.

Figure 3D:
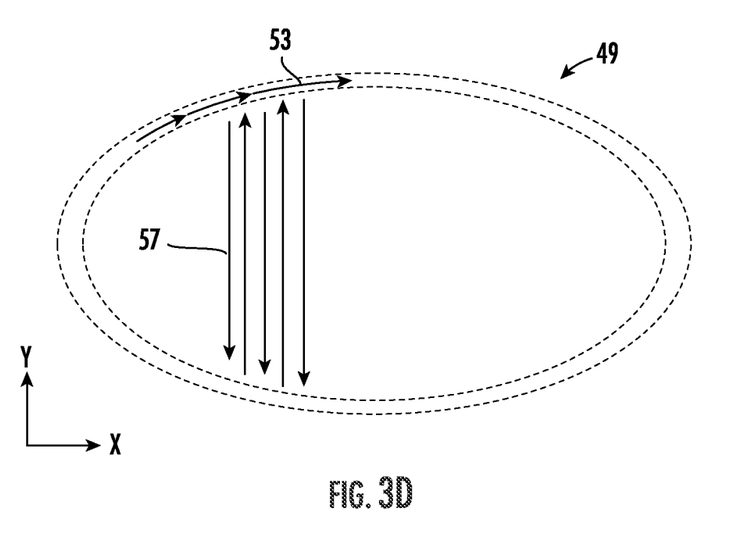
FIG. 3D is a schematic diagram of a speed-corrected vector slice defined by a speed correction module acting upon the vector slice of FIG. 3C.

FIG. 3D is a schematic diagram of a corrected vector slice 49. The speed correction module 38 processes the vector slice 48 to provide a corrected vector slice 49. The corrected vector slice 49 differs from the vector slice 48 by having corrected locations of heads and tails of the vectors 52 and 56 to provide vectors 53 and 57 respectively. The speed corrected vectors 53 and 57 correspond to scans of the energy beam(s) 26 over the layer of powder 18.

Figure 4A:
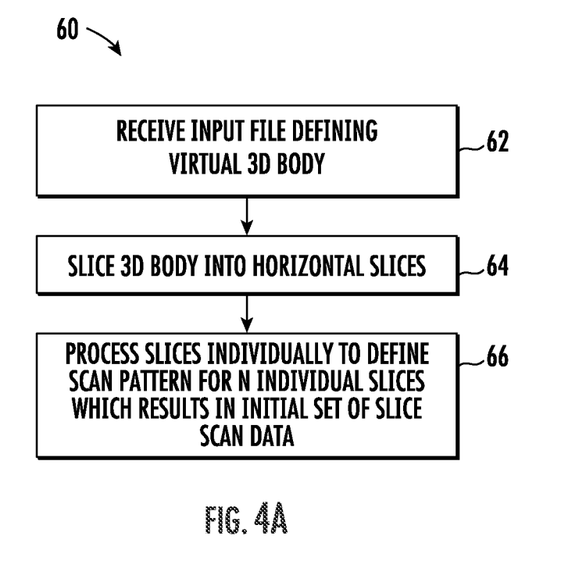
FIG. 4A is a flowchart of a method performed by a pre-processing controller.

FIG. 4A is a flowchart of an embodiment of an operational method 60 performed by controller 8. Controller 8 performs method 60 by executing software modules 34 and 36 of FIG. 2.

According to 62, controller 28 receives a 3D virtual body 32. According to 64, controller 28 executes module 36 to slice the 3D virtual body 32 into N virtual cross-sectional slices 42. According to 66, controller 28 executes module 26 to define scan vectors 52 and 56 having endpoints for the N individual slices. The result is N individual vector slices with vectors 52 and 56 that are not yet speed corrected.

Figure 4B:
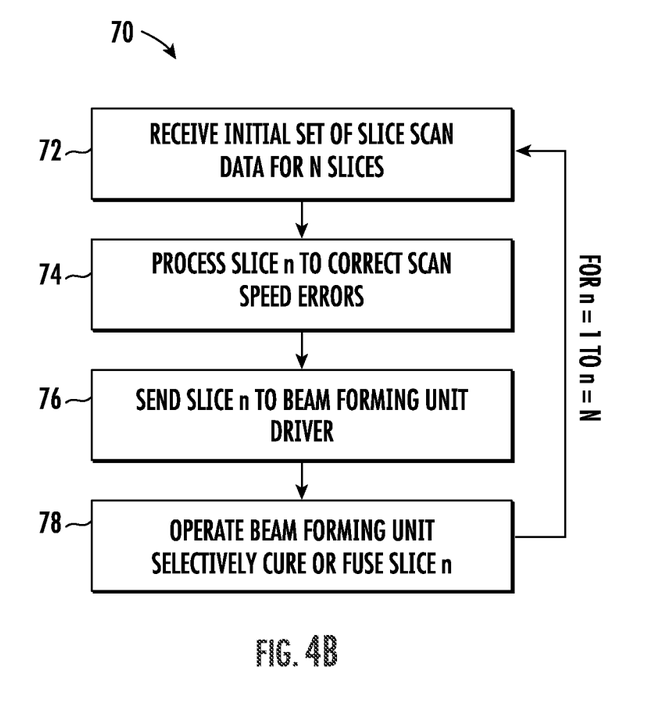
FIG. 4B is a flowchart of a method performed by a print engine controller.

FIG. 4B is a flowchart of an embodiment of an operational method 70 performed by controller 8 and more particularly by the print engine controller 30. Print engine controller 30 performs method 70 by executing software modules 38 and 40 of FIG. 2.

According to 72, controller 30 receives the aforementioned N vector slices 42 from the controller 28. According to 74, a slice (slice n of N) is processed to correct scan speed errors based upon a threshold condition. Step 74 results in a speed-corrected vector slice n. According to 76, the speed corrected vector slice is transferred to the laser scanner driver module. According to 78, the beam forming unit 24 is operated to selectively fuse a speed corrected vector slice n of the 3D article 4. As indicated, steps 72 to 78 are repeated to selectively fuse all N slices.

As a note, there may be certain process steps missing from methods 60 and 70. For example, the data may be filtered to remove extraneous vectors. Also, as part of method 70, the controller 30 can operate the motorized build platform 12 to maintain a proper height of build plane 22 and operate the coating apparatus 16 to coat a new layer of material 18 for each slice n. For some embodiments, multiple layers of material can be applied between operations of the beam forming unit 24.

In another implementation the step 74—the speed error correction—can be performed as part of method 60 rather than as part of method 70. Thus, the speed error corrections would have been incorporated into the vectors when the print engine controller 30 receives the slices. In yet other implementations, the division of the steps of methods 60 and 62 can be divided between different controllers in different ways.

Figure 5:
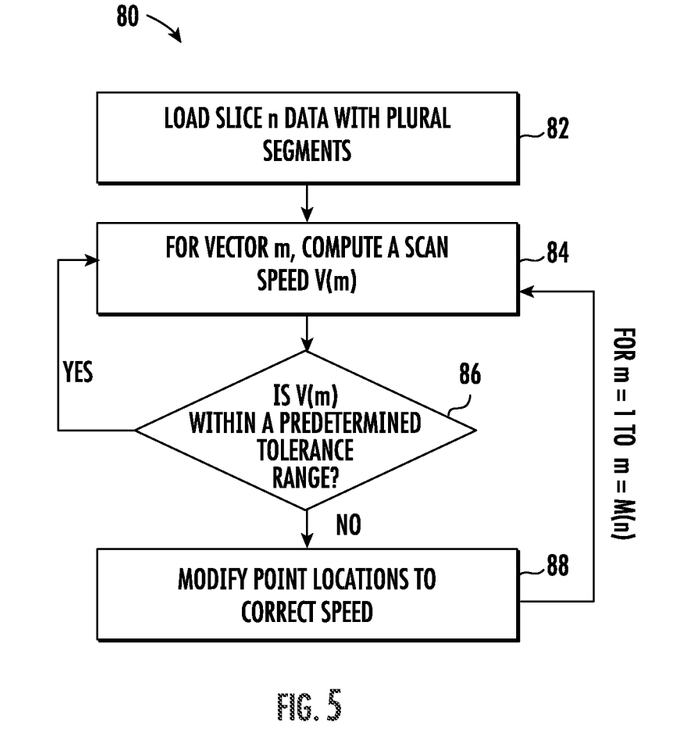
FIG. 5 is a flowchart of a first embodiment of a method performed by a print engine controller and that is a subset of the method of FIG. 4B.

FIG. 5 is a flowchart of a first embodiment of an operational method 80 performed by controller 8. Controller 8 performs method 80 by executing the software module 38 of FIG. 2. In particular, method 80 is a more detailed embodiment of step 74 of method 70 but for a single slice n.

According to 82, a slice n is received by software module 38. Slice n has M(n) vectors. As indicated M is a variable that depends upon n. According to 84, a speed for vector m (m varies from 1 to M) is measured.

To understand speed measurement, some parameters need to be defined. The beam forming module 24 has a default scan speed V, an actual scan speed v, a standard resolution step size ΔS, an actual step size Δs, and a temporal step size or time-based resolution ΔT. The temporal step size ΔT is fixed and does not vary. Thus, the scan speed varies according to v and equals step size Δs divided by temporal step size ΔT (v=Δs/ΔT). But when Δs equals ΔS, the scan speed equals the default scan speed V. Otherwise, the actual scan speed v is different than the default scan speed V.

The vectors for the slice can have a length defining a non-integer number of steps ΔS. Thus, the vector can include a number of steps of length ΔS plus a shorter step of length Δs<ΔS. Because ΔT is fixed, the shorter step will be executed in time ΔT and will therefore have a lower scan velocity. The average velocity for the vector is found by dividing a total time for scanning the vector into the length of the vector. The total time for scanning the vector equals the actual number of steps times ΔT.

As stated earlier for step 84, the scan velocity v(m) is calculated or determined for vector m. According to 86, a determination is made as to whether v(m) is within a certain predetermined tolerance range of default scan speed V. In one embodiment, a value of [V−v(m)]/V is computed which is a fractional velocity error. If v(m) is within the predetermined tolerance or fractional range of default V, then the process loops back to step 84.

If according to step 86, v(m) is not within the predetermined range, then point locations of the vector m are modified so that a length of vector m is closer to or equal to an integer number of lengths ΔS according to step 88. In an embodiment this is accomplished by lengthening the vector until the length is an integer times ΔS. Alternatively, this can be accomplished by shortening the vector until the length is an integer times ΔS. As indicated by FIG. 5, this process method is carried out for all M(n) vectors for slice n. As a result of this process, slice n will then have R(n) vectors which may equal M(n) or be larger or smaller.

Figure 5A:
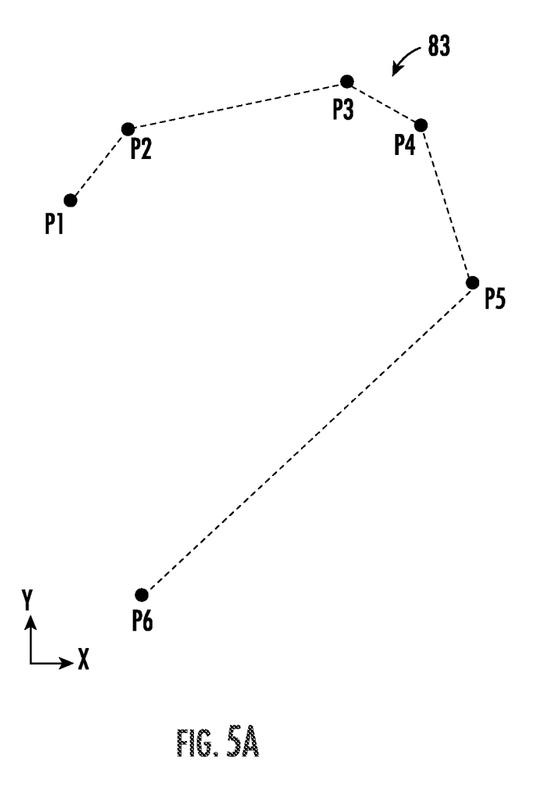
FIG. 5A is a schematic representation of a slice, contour, and sequential set of points P1-P6 that are not yet speed corrected. This corresponds to the output of vector generation module 36 (FIG. 2), FIG. 3C, and one slice n of the output of method 60 of FIG. 4A. For the illustrated slice, M(n) equals 5—in other words, there are five vectors. Each sequential pair of points represents a vector. The first vector tail is at point P1 and the first vector head is at P2 (and so on).

FIGS. 5A-G are an illustrative example of a particular embodiment of method 80 of FIG. 5. Step 82 of method 80 is represented by FIG. 5A. The loaded slice n is represented by the points P1-P6 which are sequential endpoints of move vectors of the scanning laser (e.g., laser plus motorized X-mirror and motorized Y-mirror). Thus, M(n) in this example equals 5. The first move vector is from P1 to P2. The second move vector is from P2 to P3 and this continues to the fifth move vector from P5 to P6. Without the speed correction module, there would be velocity errors as explained above. The dashed line of the sequence from P1 to P6 can be referred to as the "uncorrected contour" 83 which is not yet speed corrected.

Figure 5B:
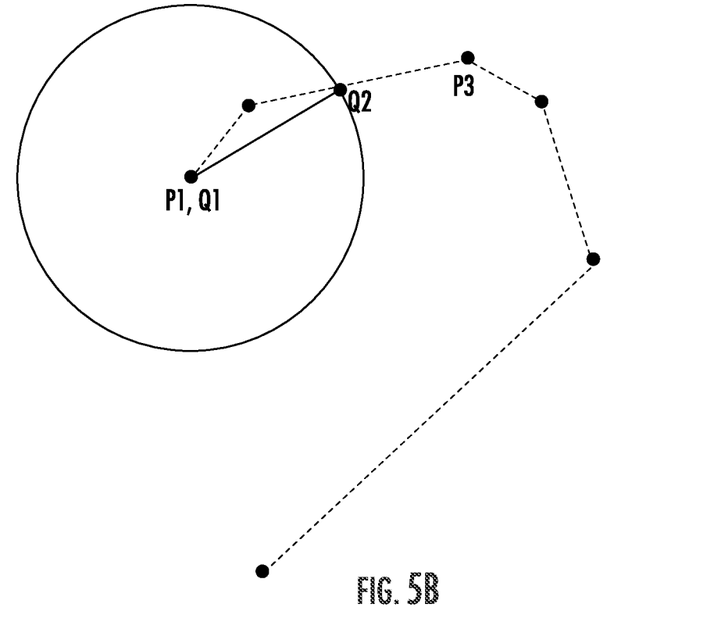
FIG. 5B depicts determination of a corrected point location Q2 for a new sequence of points. A circle of radius ΔS has its center at P1 which becomes a new first point Q1. The intersection of the circle with the original vector path or contour 83 defines the second new point Q2. The first speed corrected vector has its tail at Q1 and head at Q2.

FIGS. 5A and 5B illustrate steps for m=1. According to 84, the velocity of movement over the first segment (P1 to P2) is computed. According to 86, the measured velocity v is found to be out of tolerance. According to 88, point locations are modified and this is illustrated in FIG. 5B. A circle of radius ΔS is placed upon point P1 and an intersection Q2 to the overall path (dashed line) is determined. This becomes a new second point Q2 to "replace" P2.

Figure 5C:
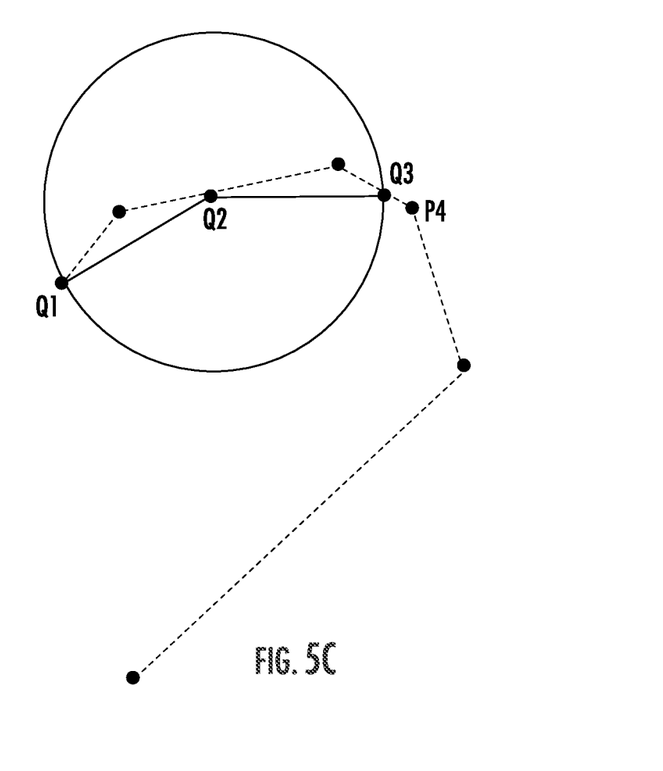
FIG. 5C depicts determination of a corrected point location Q3 for a new sequence of points. A circle of radius ΔS has its center at Q2. The intersection of the circle with the original vector path or contour 83 defines the third new point Q3. The second speed corrected vector has its tail at Q2 and head at Q3.
Figure 5D:
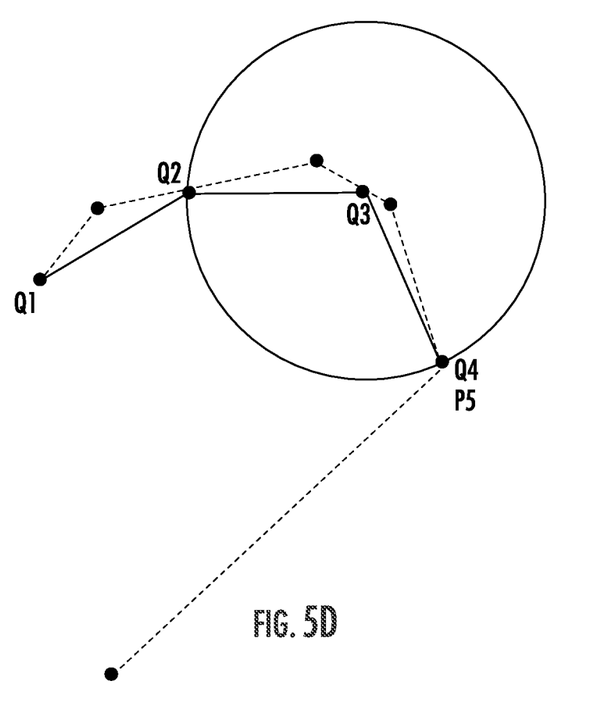
FIG. 5D depicts determination of a corrected point location Q4 for a sequence of points. A circle of radius ΔS has its center at Q3. The intersection of the circle with the original vector path or contour 83 defines the fourth new point Q4. The third speed corrected vector has its tail at Q3 and head at Q4.

The method 80 now loops back to step 84 and m indexes to m=2. The speed is now computed for the segment between Q2 and P3 (the next point on the original contour 83) and is found to be out of tolerance according to 86. For m=2, the point locations are again modified as shown in FIG. 5C.

Figure 5E:
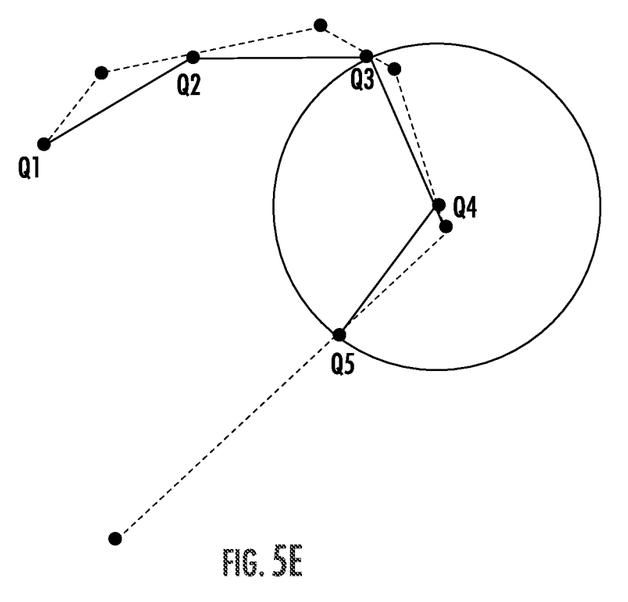
FIG. 5E depicts determination of a corrected point location Q5 for a sequence of points. A circle of radius ΔS has its center at Q4. The intersection of the circle with the original vector path or contour 83 defines the fifth new point Q5. The fourth speed corrected vector has its tail at Q4 and head at Q5.
Figure 5F:
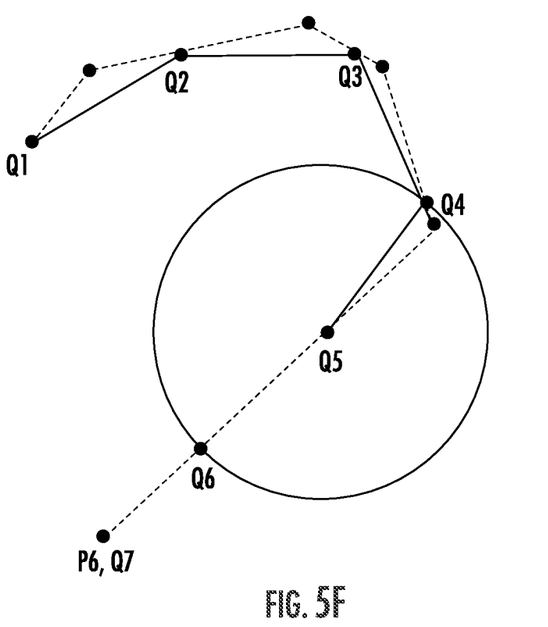
FIG. 5F depicts determination of a corrected point location Q6 for a sequence of points. A circle of radius ΔS has its center at Q5. The intersection of the circle with the original vector path or contour 83 defines the sixth new point Q6. The fifth speed corrected vector has its tail at Q5 and head at Q6.

Method 80 continues for m=3 (FIGS. 5C/5D), m=4 (FIGS. 5D/5E) and m=5 (FIGS. 5E/5F). For the very last segment (Q6 to Q7)—in this illustrated embodiment—the segment is a non-integer multiple of the standard resolution step size ΔS because Q7 is coincident with the point P6.

Figure 5G:
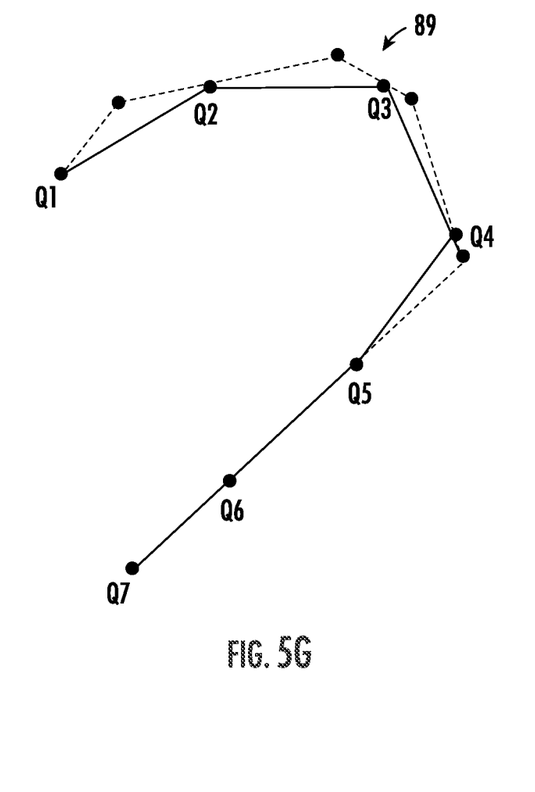
FIG. 5G is a schematic representation of a slice, contour, and sequential set of points Q1-Q7 that have been speed corrected. The vectors defined by Q1-Q7 correspond to the output of speed correction module 38 (FIG. 2), FIG. 3D, one slice n of the output of steps 72-76 of method 70 of FIG. 4B, and the output of method 80 of FIG. 5. Each sequential pair of points represents a speed corrected vector.

In summary: Element 83 in FIG. 5A refers to the uncorrected contour defined by the initial points P1 to P6 before method 80 is performed. Element 89 in FIG. 5G refers to the speed corrected contour defined by points Q1 to Q7 after method 80 is performed. Thus, points P1-P6 of FIG. 5A illustrate the uncorrected slice and points Q1-Q7 of FIG. 5G illustrate the speed corrected slice. In the illustrated uncorrected slice of FIG. 5A, M(n)=5. In the speed-corrected slice of FIG. 5G, R(n)=6. In other words, the speed correction has resulted in an added endpoint to the sequence of endpoints.

Figure 6:
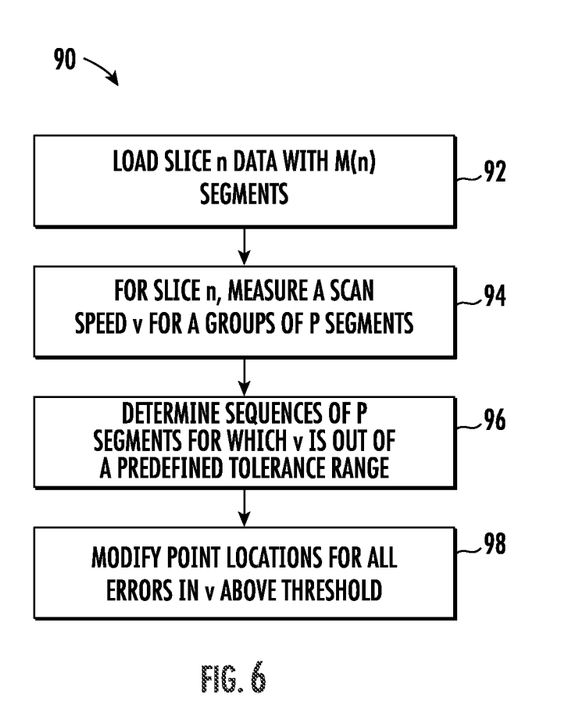
FIG. 6 is a flowchart of a second embodiment of a method performed by a print engine controller and that is a subset of the method of FIG. 4B.

FIG. 6 is a flowchart of a second embodiment of an operational method 90 performed by controller 8 and more particularly by the print engine controller 30. Print engine controller 30 performs method 80 by executing the software module 38 of FIG. 2. In particular, method 90 is a more detailed embodiment of step 74 of method 70 but for a single slice n. Method 90 differs from method 80 in that ab average value for v(m) is computed and responded to for groups of P vectors rather than one vector at a time. P can equal 2 or more.

According to 92, a slice n is received by software module 38. Module 38 has M(n) vectors. As indicated M is a variable that depends upon n. According to 94, a scan speed is measured for the groups of P segments. For example, groups of two segments at a time can be measured. Step 94 is carried out for all segments. If there is a remainder of segments, this process can be carried out for the remainder as well. The measurement method is similar to that of measuring one segment, except that the computation is to compute the length sum of the segments divided by the total time for the segments.

According to 96, a determination is made as to which groups of vectors are out of tolerance—which groups of P segments have a velocity percentage error that is above a predetermined threshold.

According to 98, point locations are modified for any groups of vectors that are out of tolerance. For example, this can be accomplished by moving a connecting point between two segments so that the individual lengths of the segments are individually closer to an integer number of the distance ΔS.

In a third embodiment, step 74 of method 70 can utilize both method 70 and 80. The specific embodiments and applications thereof described above are for illustrative purposes only and do not preclude modifications and variations encompassed by the scope of the following claims.

What is claimed:

1. A three-dimensional (3D) printing system comprising:
    a print engine including:
        a motorized build platform;
        a coating apparatus for forming a uniform layer of build material over the build platform; and
        a beam forming unit configured to scan an energy beam over a build plane that is above the build platform; and
    a controller configured to perform the following steps:
        (a) receiving a virtual 3D body;
        (b) processing the 3D body to define a plurality of N slices, the N slices individually representing intersections of the 3D body with the slice;
        (c) processing the N slices to represent solid portions of the 3D body with vectors, the vectors defining contours and hatching patterns, the vectors individually are bounded by two endpoints;

(d) for the individual slices, computing an actual scan speed (v) for one or more of the vectors, the vectors individually defined between two endpoints;

(e) for the individual slices, defining a scan speed error by computing a difference between the actual scan speed (v) and a default scan speed (V);

(f) for the individual slices, if the scan speed error is larger than a predetermined threshold, then moving one of the two endpoints to a new location to reduce the scan speed error so as to provide a plurality of speed corrected slices;

(g) operating the print engine to fabricate a three-dimensional article in a layer-by-layer manner using the plurality of speed corrected slices.

2. The three-dimensional (3D) printing system of claim 1 wherein the controller includes at least two separate controllers including a pre-processing controller and a print engine controller, the two separate controllers are physically separated from each other.

3. The three-dimensional (3D) printing system of claim 1 wherein the controller defines a relationship $\Delta T*V=\Delta S$, $\Delta T$ equals a temporal step size for the beam forming unit, $\Delta S$ equals a dimensional step size for the beam forming unit, and V=the default scan speed, moving one of the two endpoints of the vector changes the length of the vector to more closely approximate an integer number times $\Delta S$ so that the actual speed (v) more closely approximates the default scan speed (V).

4. The three-dimensional (3D) printing system of claim 1 wherein steps (d) and (e) include, for a sequence of two or more individual vectors of the plurality of vectors:

computing an average scan speed for the sequence of two or more vectors;

comparing the average scan speed with a default scan speed to determine the scan speed error; and if the scan speed error is larger than the predetermined threshold, then moving one or more endpoints of the two or more vectors to reduce or eliminate the scan speed error.

5. The three-dimensional (3D) printing system of claim 1 wherein the controller is configured to:

operate the motorized build platform to position an upper surface of the motorized build platform or build material proximate to the build plane;

operate the coating apparatus to form a new layer of the build material over the upper surface of the motorized build platform or build material; and utilize the speed corrected slice to operate the beam forming unit to selectively solidify the new layer of build material.

6. A method of manufacturing a 3D article comprising:
providing a 3D printing system including:
a print engine including:
a motorized build platform;
a coating apparatus for forming a uniform layer of build material over the build platform; and
a beam forming unit configured to scan an energy beam over a build plane the build plane that is above the build platform; and
(a) receiving a virtual 3D body;
(b) processing the 3D body to define a plurality of N slices, the N slices individually representing intersections of the 3D body with the slice;
(c) processing the N slices to represent solid portions of the 3D body with vectors, the vectors defining contours and hatching patterns, the vectors individually are bounded by two endpoints;

(d) for the individual slices, computing an actual scan speed (v) for one or more of the vectors, the vectors individually defined between two endpoints;

(e) for the individual slices, defining a scan speed error by computing a difference between the actual scan speed (v) and a default scan speed (V);

(f) for the individual slices, if the scan speed error is larger than a predetermined threshold, then moving one of the two endpoints to a new location to reduce the scan speed error so as to provide a plurality of speed corrected slices; and (g) operating the print engine to fabricate a three-dimensional article in a layer-by-layer manner using the speed corrected slices.

7. The method of claim 6 wherein the 3D printing system includes a controller which further includes at least two separate controllers including a pre-processing controller and a print engine controller that are physically separated from one another.

8. The method of claim 6 further including defining the relationship $\Delta T*V=\Delta S$, $\Delta T$ equals a temporal step size for the beam forming unit, $\Delta S$ equals a dimensional step size for the beam forming unit, and V=the default scan speed, moving one of the two endpoints of the vector changes the length of the vector to more closely approximate an integer number times $\Delta S$ so that the actual speed (v) more closely approximates the default scan speed (V).

9. The method of claim 6 wherein steps (d) and (e) include, for a sequence of two or more individual vectors of the plurality of vectors:

computing an average scan speed for the sequence of two or more vectors;

comparing the average scan speed with a default scan speed to determine the scan speed error; and if the scan speed error is larger than the predetermined threshold, then moving one or more endpoints of the two or more vectors to reduce or eliminate the scan speed error.

10. The method of claim 6 further including:
operating the motorized build platform to position an upper surface of the motorized build platform or build material proximate to the build plane;
operating the coating apparatus to form a new layer of the build material over the upper surface of the motorized build platform or build material; and
utilizing the speed corrected slice to operate the beam forming unit to selectively solidify the new layer of build material.

11. A non-transient storage medium storing software instructions for controlling a 3D printing system, the 3D printing system includes:
a print engine including:
a motorized build platform;
a coating apparatus for forming a uniform layer of build material over the build platform; and
a beam forming unit configured to scan an energy beam over a build plane that is above the build platform;
wherein when executed by a processor, the software instructions perform the following steps:
(a) receiving a virtual 3D body;
(b) processing the 3D body to define a plurality of N slices, the N slices individually representing intersections of the 3D body with the slice;
(c) processing the N slices to represent solid portions of the 3D body with vectors, the vectors defining contours and hatching patterns, the vectors individually are bounded by two endpoints;

(d) for the individual slices, computing an actual scan speed (v) for one or more of the vectors, the vectors individually defined between two endpoints;

(e) (e) for the individual slices, defining a scan speed error by computing a difference between the actual scan speed (v) and a default scan speed (V);

(f) (f) for the individual slices, if the scan speed error is larger than a predetermined threshold, then moving one of the two endpoints to a new location to reduce the scan speed error so as to provide a plurality of speed corrected slices;

(g) (g) operating the print engine to fabricate a three-dimensional article in a layer-by-layer manner using the plurality of speed corrected slices.

12. The non-transient storage medium of claim 11 wherein the 3D printing system includes two controllers including a pre-processing controller and a print engine controller that are physically separated from one another.

13. The non-transient storage medium of claim 11 wherein the steps further include defining a relationship $\Delta T*V=\Delta S$, $\Delta T$ equals a temporal step size for the beam forming unit, $\Delta S$ equals a dimensional step size for the beam forming unit, and V=the default scan speed, moving one of the two endpoints of the vector changes the length of the vector to more closely approximate an integer number times $\Delta S$ so that the actual speed (v) more closely approximates the default scan speed (V).

14. The non-transient storage medium of claim 11 wherein steps (d) and (e) include, for a sequence of two or more individual vectors of the plurality of vectors:

computing an average scan speed for the sequence of two or more vectors;

comparing the average scan speed with a default scan speed to determine the scan speed error; and if the scan speed error is larger than the predetermined threshold, then moving one or more endpoints of the two or more vectors to reduce or eliminate the scan speed error.

15. The non-transient storage medium of claim 11 wherein the steps include:

operating the motorized build platform to position an upper surface of the motorized build platform or build material proximate to the build plane;

operating the coating apparatus to form a new layer of the build material over the uppers surface of the motorized build platform or build material; and utilizing the speed corrected slice to operate the beam forming unit to selectively solidify the new layer of build material.

* * * * *